United States Patent

[11] 3,545,564

| [72] | Inventor | Alfred W. Barber<br>Bayside, New York (32-44 Francis Lewis Bldg., Flushing, N.Y. 11358) |
|---|---|---|
| [21] | Appl. No. | 838,444 |
| [22] | Filed | July 2, 1969 |
| [45] | Patented | Dec. 8, 1970<br>Continuation-in-part of application Ser. No. 815,285, April 11, 1969. This application July 2, 1969, Ser. No. 838,444 |

[54] SOUND LEVEL INDICATOR FOR THE PRECISE DETERMINATION OF SOUND LEVELS
8 Claims, 6 Drawing Figs.

| [52] | U.S. Cl. | 181/.5 |
|---|---|---|
| [51] | Int. Cl. | G01v 1/00 |
| [50] | Field of Search | 181/0.5;<br>179/101(S) |

[56] References Cited
UNITED STATES PATENTS
3,200,899  8/1965  Krauss........................ 181/0.5

Primary Examiner—Richard A. Farley
Assistant Examiner—Joseph G. Baxter

ABSTRACT: Precise determination of predetermined sound levels is provided by the combination of a microphone of known sensitivity, one or more amplifiers in cascade each having a predetermined gain, a sensitive voltage comparator for comparing the amplifier rectified output with a known reference voltage, and a lamp indicator which is energized when the amplifier output exceeds the reference voltage.

SOUND LEVEL INDICATOR FOR THE PRECISE DETERMINATION OF SOUND LEVELS

The present application is a continuation-in-part of the Pat. application entitled Sound Intensity Indicator System filed Apr. 11, 1969 and bearing Ser. No. 815,285.

Prior art sound level meters have been relatively complicated and expensive devices. They have used analog indicating meters for the readout and switches for changing ranges. The maximum range of sound levels which could be indicated without switching was of the order of 10 to 20 db. Accuracy depended on elaborate calibrating procedures and finally on the accuracy of the indicating meter.

SUMMARY

Sound level indication can be provided at discrete steps and over a very wide range by using a series of cascaded amplifiers, each coupled to indicating means. Complete accuracy of the indicated steps can be provided by means of a combination of gain defined operational amplifiers and accurately referenced comparators. Intermediate steps can be provided by stepping the gain of one or more of the cascaded amplifiers or by stepping the reference voltages of one or more of the comparators. The indicators can be continuously operative or they can be locking in which case, maximum levels are indicated until reset.

BRIEF DESCRIPTION OF THE DRAWINGS

FIG. 1 includes operational amplifier 1 with inverting input 3, noninverting input 4 and output 5. The sound pickup microphone 2 is connected from noninverting input 4 to ground G. The amplifier gain is determined by adjustable or variable resistor 6 connected between output 5 and inverting input 3 and resistor 7 connected between input 3 and ground G. The adjustment and calibration of gain determining resistor 6 will be more fully described below.

Figure 1:
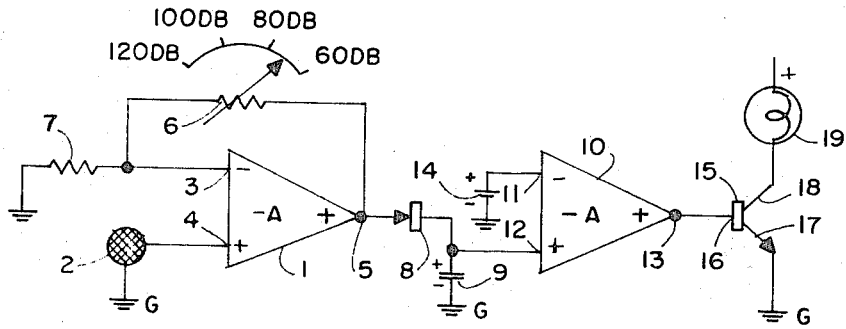
FIG. 1 is a simplified schematic, partly in block form, of a one level sound level indicator.

A second amplifier 10 having noninverting input 12, inverting input 11 and output 13 is provided as a comparator. The output of amplifier 1 is rectified by means of rectifier 8 providing a d.c. voltage across capacitor 9. This voltage is compared with a reference voltage 14 so that amplifier 10 produces an output at 13 whenever the rectified voltage across capacitor 9 equals or exceeds the reference voltage 14. The output voltage of amplifier 10 is applied to base 16 of lamp driver transistor 15. Emitter 17 is returned to ground G. Collector 18 is connected through indicator lamp 19 to a suitable source of positive bias (not shown).

Thus, the circuit of FIG. 1 as described in detail above, operates to indicate by the lighting of lamp 19 whenever the sound level in the area of microphone 2 is equal to or above the level which produces a voltage in microphone 2, which when multiplied by the adjusted gain of amplifier 1 exceeds the reference voltage 14. The voltage to be indicated can thus be set, with a given microphone sensitivity, by adjusting the gain of amplifier 1 and/or by changing the reference voltage 14. In accordance with operational amplifier theory, the gain of amplifier 1 can be accurately determined by the values of resistors 6 and 7 as long as the open loop gain of amplifier 1 is in substantial excess of the closed loop gain. The comparator amplifier 10 is assumed to have high gain so that lamp 19 is energized whenever rectified voltage from amplifier 1 (across capacitor 9) just equals or exceeds reference voltage 14. Expressed mathematically lamp 19 is energized whenever the sound pressure at the microphone exceeds that which produces a microphone terminal voltage equal to the voltage of reference 14 divided by the closed loop gain of amplifier 1 which, in turn, is equal to the resistance of resistor 6 divided by the resistance of resistor 7.

As suggested by the db. scale above resistor 6, a scale may be provided reading in sound pressure expressed in db. above ODBM. When resistor 6 is adjusted to a predetermined setting, say 80 db., the lamp 19 will be turned on by a sound pressure equal to or greater than 80 db. above ODBM.

Figure 2:
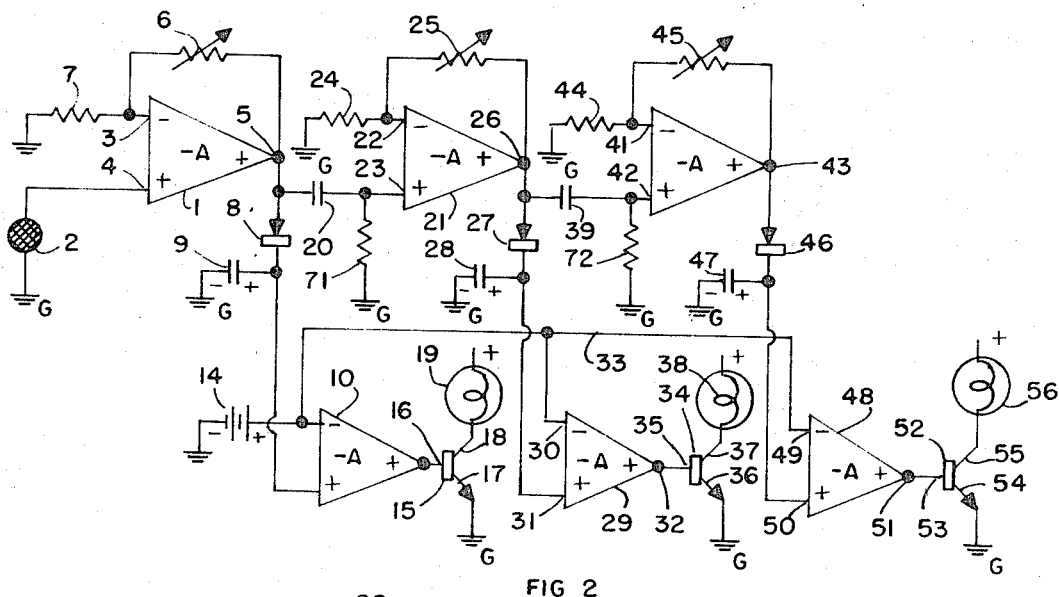
FIG. 2 is an extension of the concept of FIG. 1 to a three level indicator.

FIG. 2 is a circuit for providing three indicating lamps for accurately measuring three predetermined sound levels. The first stage bears the same numbers as in FIG. 1 and functions as described above. A second lamp 38 is energized by amplifier 21 and comparator 29 cascaded with amplifier 1. Amplifier 21 is an operational amplifier having a noninverting input 23 coupled by capacitor 20 to output 5 of amplifier 1. Amplifier 21 includes an output terminal 26 and an inverting input terminal 22. Gain is determined by the ratio of the resistance of resistor 25 connected from output 26 to input 22 to the resistance of resistor 24 connected from input 22 to ground G. The output from amplifier 21 is rectified by rectifier 27 charging capacitor 28. The d.c. voltage across capacitor 28 is compared with reference voltage 14 by comparator amplifier 29, the capacitor voltage being applied to input terminal 31 and the reference voltage to input terminal 30. Comparator output terminal 32 is connected to base 35 of lamp driver transistor 34. Emitter 36 is returned to ground G and collector 37 is connected through lamp 38 to a suitable source of bias (not shown).

FIG. 2 includes a third lamp 56 similarly supplied by amplifier 40 cascaded with amplifier 21. Amplifier 40 has inverting input terminal 41, noninverting input terminal 42 and output terminal 43. Output 26 is coupled to input 42 by capacitor 39. Gain is determined by resistors 45 and 44. The output is rectified by rectifier 46 and the resulting d.c. across capacitor 47 is applied to input terminal 50 of comparator 48. Reference voltage 14 is connected to comparator input terminal 49. Output terminal 51 is connected to base 53 of lamp driver transistor 52. Emitter 54 is returned to ground G and collector 55 is connected through lamp 56 to a source of bias (not shown).

FIG. 2 operates to provide lamp indications of three predetermined sound intensities. Resistors 6, 25 and 45 are adjusted or set to provide the three chosen levels of indication. For example, the circuit may be adjusted so that lamp 56 lights at 60 db., lamp 38 at 80 db. and lamp 19 at 100 db. above ODBM. It will be obvious that more stages may be added in cascade set to indicate other sound levels. More stages can provide a wider range and/or finer steps as, for example, ten 5db. steps.

If resistor 72 connected from input terminal 42 has a resistance equal to the resistance of resistor 44, the input current to amplifier 40 will be balanced and will have a minimized effect on the output voltage. Similarly resistor 71 connected from input terminal 23 is used to balance the input current to amplifier 21. Input current to amplifier 1 is balanced by making resistor 7 equal to the d.c. resistance of microphone 2.

Figure 3:
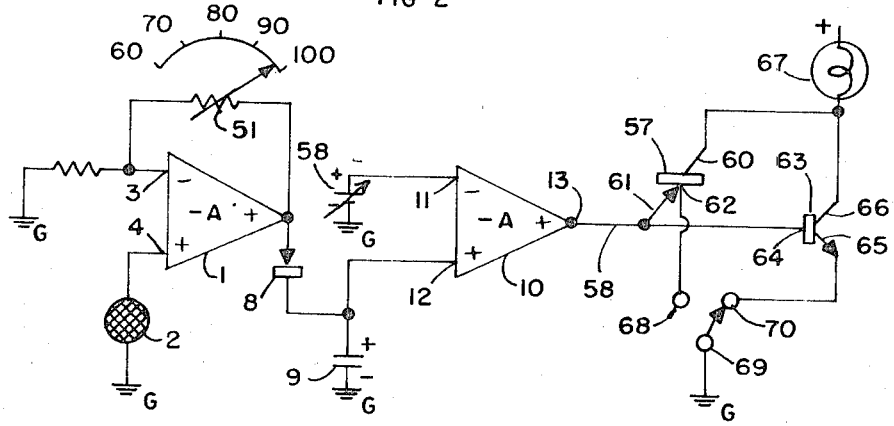
FIG. 3 extends the concept of FIG. 1 to the choice of continuous or lockup indicators.

FIG. 3 is similar to FIG. 1 and bears similar numbering except for the lamp drive circuit. Lamp 67 is connected to collector 66 of transistor 63 and to anode 60 of silicon controlled rectifier 57. Base 64 and gate 61 are connected over lead 58 to output terminal 13 of comparator 10. Cathode 62 is connected to point 68 of two-position switch 68-69-70. Emitter 65 is connected to switch point 70. Switch contact arm 69 is returned to ground G. When arm 69 is set to point 70, lamp 67 lights whenever the sound level at microphone 2 is equal to or above a predetermined level and is out for lower levels. When contact 69 is closed to contact 68, the silicon controlled rectifier fires whenever the sound level at microphone 2 exceeds the predetermined level causing lamp 67 to light. However, once lit, lamp 67 remains on even when the sound level falls below the predetermined level since the silicon controlled rectifier, once it is rendered conducting remains conducting until reset by opening contacts 68-69. This is then a latching circuit in which once lit the lamp remains energized until reset by opening the switch contacts. Thus, the sound level indicator maybe operated as an instantaneous level indicator or it may be operated to indicate continuously (until reset) to show that the sound level has instantaneously equalled or exceeded a predetermined level during a given operating time interval.

Figure 4:
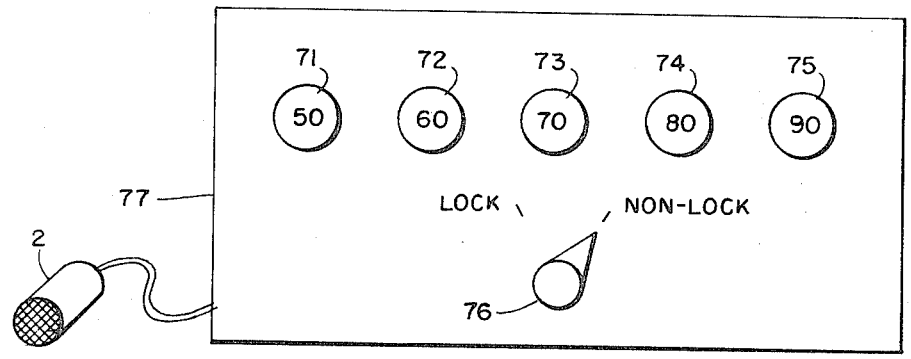
FIG. 4 is a simple illustration of a level indicator in accordance with the present invention.

FIG. 4 shows a simplified illustration of a sound level indicator in its external appearance. Panel 77 carries a plurality of sound level indicator lamps 71, 72, 73, 74 and 75 carrying db. level designations 50, 60, 70, 80 and 90 respectively. The sounds to be indicated are picked up by microphone 2. A switch 76 is provided to switch between locking and nonlocking indications as described above.

Figure 5:
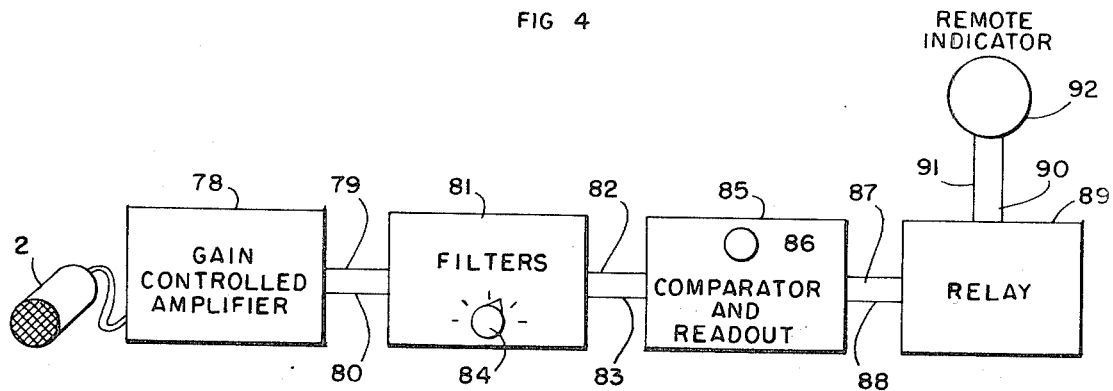
FIG. 5 illustrates filters combined in the present invention.

FIG. 5 is a block diagram in which filters are combined with the sound level indicator system so that predetermined frequency responses can be selected for indication. Sounds picked up by microphone 2 are amplified by a predetermined amount by gain controlled amplifier 78; the amplified sound responsive signals are applied over leads 79 and 80 to filters 81 the response of which are selected by switch 84; the amplified and frequency selected signals are applied over leads 82 and 83 to comparator and readout 85 having an indicator 86. If a remote indicator 92 is desired, it can be provided by means of relay 89 coupled to indicator 86 over leads 87 and 88 and energized over leads 90 and 91.

Figure 6:
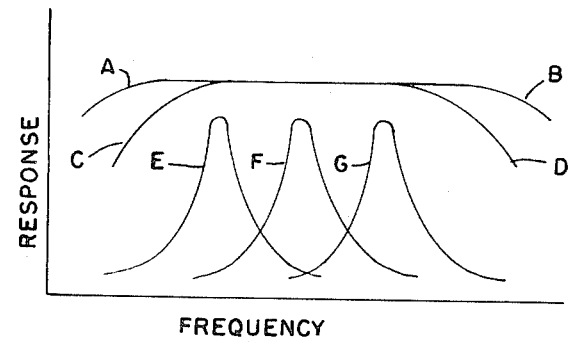
FIG. 6 is a series of graphs illustrating the present invention with filtering.

FIG. 6 illustrates some of the possible frequency selection of sound indications which may be provided by filters 81 (FIG. 5). The response A-B shows a flat response which would be obtained without filtering; C shows low frequency attenuation by means of a high-pass filter; D high frequency attenuation by means of a low-pass filter; and curves E, F and G narrow ranges obtainable with three different frequency selective filters. The filtering function is useful in analyzing sound intensities in various frequency ranges or in providing indications of desired sounds in the presence of interfering sounds in certain frequency ranges. The selective filters permit, for example, the measurement of sounds in a particular range while excluding undesirable sounds in other ranges.

The comparators described above comprise a reference voltage and an operational amplifier. Other types of comparators may be used. A Schmitt trigger, for example, may be used as a comparator although it will not provide as accurate a result as the comparator set forth above. The choice of comparators may depend on accuracy and cost and the intended use of the sound level indicator.

I claim:
1. In a sound level indicating system, the combination of, a microphone for generating signals in response to sound pressure to be indicated:

an operational amplifier including calibrated adjustable gain determining means connected to said amplifier, coupled to said microphone for amplifying said microphone generated signals;
means for rectifying said amplified signals to provide a direct current voltage;
means for comparing said direct current voltage with a reference voltage and providing an output voltage in response to substantial equality between said direct current voltage and said reference voltage; and indicating means responsive to said output voltage.

2. A sound level indicating system as set forth in claim 1; wherein said indicating means includes latching means for turning on an indicating lamp and a reset switch connected to said latching means.

3. In a multiple level sound indicating system, the combination of:
a plurality of cascaded amplifiers;
a microphone for generating signals in response to sound pressures to be indicated connected to the input to the first of said amplifiers;
rectifiers connected to the outputs of each of said amplifiers for providing a plurality of direct current voltages;
means for comparing each of said direct current voltages with a reference voltage and providing output signals in response to substantial equality between said direct current voltages and said reference voltage;
and a plurality of indicating means individually responsive to said output signals for indicating a plurality of predetermined sound levels.

4. A sound level indicating system as set forth in claim 3; and including filter means connected between said microphone and said indicating means for selecting a predetermined frequency range of sound to be indicated.

5. A sound level indicating system as set forth in claim 3; and including remote indicating means.

6. A sound level indicating system as set forth in claim 3; wherein said indicating means are marked to show the indicated sound level in db. above a predetermined 0-db. reference level.

7. A sound level indicating system as set forth in claim 3; and including means for changing the sound levels to be indicated by a predetermined increment.

8. A sound level indicating system as set forth in claim 3; wherein the amplifier connected to the microphone is an operational amplifier including an inverting input terminal, a noninverting input terminal and an output terminal and the microphone is connected to the noninverting input terminal and a resistor substantially equal to the resistance of the microphone is connected to the inverting input terminal for substantially offsetting the effect of input current to said operational amplifier.